Aug. 22, 1950 — L. K. HAYFORD — 2,519,835
SAW FOR CABLE SHEATHS
Filed May 3, 1947
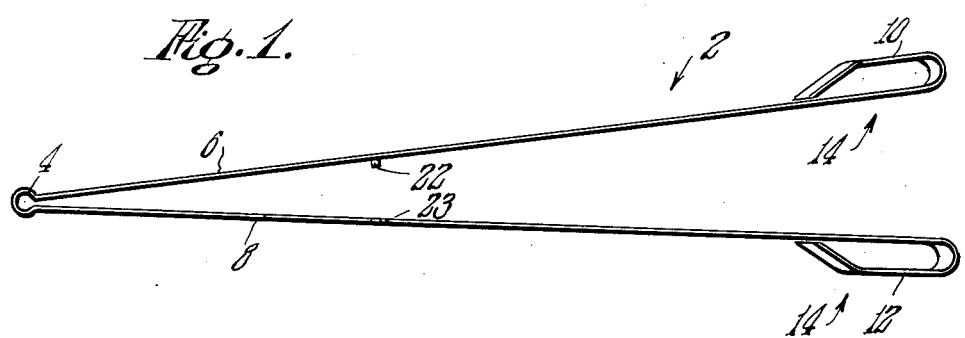
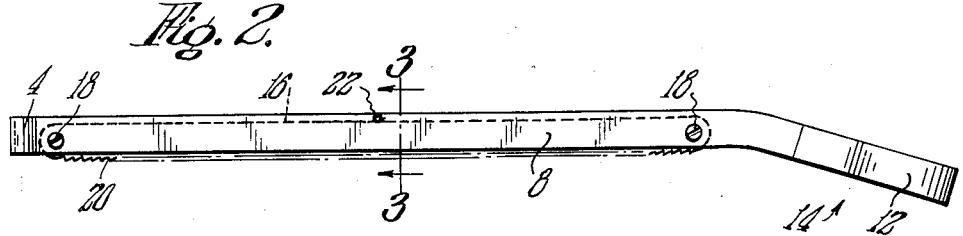
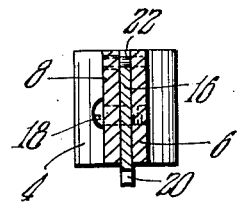
INVENTOR.
Lyman K. Hayford.
BY Walter C. Ross
Attorney.

Patented Aug. 22, 1950

2,519,835

UNITED STATES PATENT OFFICE 2,519,835

SAW FOR CABLE SHEATHS

Lyman K. Hayford, Springfield, Mass.

Application May 3, 1947, Serial No. 745,679

1 Claim. (Cl. 145—31)

This invention relates to improvements in saws and is directed more particularly to saws for cutting through outer coverings of objects.

The principal object of the invention is the provision of a saw which is adapted for cutting through an outer covering or layer of material. For instance, the saw of the invention is adapted for cutting through the metal covering or sheath of electric cable and is so constructed and arranged that the inner components of the cable are not cut or damaged.

As a special feature of the invention, the saw is provided with a handle portion which is offset or disposed below the plane of the upper edge of the saw so that the handle or hands thereof do not prevent use of the saw in close proximity to a wall, ceiling or the like.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is an edge view of a saw frame embodying the novel features of the invention;

Fig. 2 is a side elevational view of a saw embodying the novel features of the invention; and Fig. 3 is a sectional view on the line 3—3 of Fig. 2.

Referring now to the drawings more in detail, the invention will be fully described.

A frame member 2 is provided which is formed from a single strip of metal.

The metal strip will be yieldable and more or less springlike and is formed intermediate its ends with an eye portion 4.

Side arms 6 and 8 extend from the eye 4 and their end portions are bent so as to have outer portions 10 and 12 extending towards the eye 4.

The portions 10 and 12 and the adjacent portion of the members 6 and 8 provide handle portions indicated generally by 14.

Preferably the side arms 6 and 8 will tend to assume a diverging relation so that a saw blade such as 16 may be placed therebetween.

The side arm 8 is provided with holes therethrough which are spaced to agree with the usual holes in opposite ends of an ordinary hacksaw blade.

Screws 18 extend through said openings in the side arm 8 and hacksaw blade 16 and are in threaded engagement with tapped holes provided in the side arm 6.

The side arms are drawn together with the hacksaw blade therebetween and by means of the screws the hacksaw blade is clamped between the side arms and a strong and stiff construction is provided.

The teeth 20 of the hacksaw blade extend but a short distance below the lower edges of the side arms 6 and 8 so that in use the teeth will cut through the outer metal covering or sheath of a cable or the like. After the sheath has been severed the lower edges of the side arms act as a guide to prevent the teeth going into the cable interior.

A pin 22 secured to side arm is adapted to fit in a hole in the arm 8 when the arms are in blade clamping relation and against this the upper edge of the hacksaw abuts.

The handle portions 14, as shown in Fig. 2, are disposed in an inclined relation and below the plane of the longitudinal upper edges of the side arms. This makes it possible to use the saw in close proximity to a ceiling or wall since the hand gripping the handle portions does not interfere.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A hack saw construction comprising in combination, an elongated relatively narrow strip of spring-like metal bent laterally intermediate its opposite ends to form an eye at the forward end thereof and provide elongated free side portions extending rearwardly from said eye, portions at the rear ends of said side portions being curved outwardly laterally therefrom and then extending forwardly into substantial parallelism relative to and spaced from the side portions with the extremities thereof bent forwardly and inwardly to said side portions forming adjacent laterally disposed elongated loop-shaped handles, an elongated saw blade having holes at opposite ends thereof disposed between said side portions and provided with teeth on the lower edge thereof projecting below the lower edges of said side portions and having an upper edge disposed below and parallel to the upper edges of the side portions, said side portions provided with bolt holes in alignment with the holes of said blade, bolts extending through the holes of said saw blade and side portions clamping said saw blade between said side portions, a pin secured to the inner side of one of said side portions adjacent the upper edge thereof for abutment by the upper edge of said blade and the inner face of the other side portion receiving the outer end of said pin, and said handles being arranged rearwardly of the end of the saw blade with the upper edges thereof disposed in a plane inclining downwardly and rearwardly away from the ends of the side portions and blade and the plane of the upper edges of the side portions.

LYMAN K. HAYFORD.

REFERENCES CITED

The following references are of record in the file of this patent:

UNITED STATES PATENTS

| Number | Name | Date |
|---|---|---|
| 949,669 | Weir | Feb. 15, 1910 |
| 1,497,577 | Morza | June 10, 1924 |
| 1,855,311 | Rasner | Apr. 26, 1932 |
| 1,871,069 | Maher | Aug. 9, 1932 |
| 1,896,912 | Morse | Feb. 7, 1933 |